(12) United States Patent
Sakuraba et al.

(10) Patent No.: US 8,757,343 B2
(45) Date of Patent: Jun. 24, 2014

(54) CLUTCH MECHANISM

(75) Inventors: Shigeyoshi Sakuraba, Obu (JP); Yasuo Tabuchi, Toyoake (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 12/953,999

(22) Filed: Nov. 24, 2010

(65) Prior Publication Data

US 2011/0127136 A1    Jun. 2, 2011

(30) Foreign Application Priority Data

Nov. 30, 2009 (JP) ................................. 2009-271475

(51) Int. Cl.
*F16D 27/112* (2006.01)

(52) U.S. Cl.
USPC .................. 192/84.94; 192/84.961; 192/200; 192/30 V

(58) Field of Classification Search
CPC .......................... F16D 2027/007; F16D 27/108
USPC ........................ 192/84.94, 84.961, 84.96, 200
See application file for complete search history.

(56) References Cited

U.S. PATENT DOCUMENTS

| | | | | |
|---|---|---|---|---|
| 5,944,158 | A * | 8/1999 | Okazaki ..................... | 192/84.96 |
| 6,286,650 | B1 * | 9/2001 | Tabuchi et al. ............. | 192/84.94 |
| 6,622,843 | B2 * | 9/2003 | Nakagawa et al. ......... | 192/84.941 |
| 6,823,974 | B2 * | 11/2004 | Hayashi .................... | 192/84.961 |
| 7,721,863 | B2 * | 5/2010 | Matsumura et al. ........ | 192/84.94 |
| 2003/0159901 | A1 | 8/2003 | Hayashi | |
| 2005/0183923 | A1 * | 8/2005 | Konishi et al. ............ | 192/84.961 |

FOREIGN PATENT DOCUMENTS

JP    U-62-167936    10/1987
JP    U-2-4034    1/1990

OTHER PUBLICATIONS

Office Action mailed Oct. 25, 2011 in corresponding JP Application No. 2009-271475 (and English translation).

* cited by examiner

*Primary Examiner* — Richard M. Lorence
*Assistant Examiner* — Lillian Nguyen
(74) *Attorney, Agent, or Firm* — Posz Law Group, PLC

(57) ABSTRACT

A clutch mechanism includes a pulley, an armature, an electromagnet, a plate spring and a damper. The armature combines with the pulley in a direction of a rotation axis. The electromagnet generates attracting magnetic force, which attracts the armature in a joining direction. The plate spring generates resilient force, which urges the armature in an opposite direction from the joining direction. The damper includes an impact mitigation part mitigating an impact when the armature collides with the pulley. The pulley, the armature, the damper and the plate spring are arranged in this order in the direction of the rotation axis. The damper includes a contact portion contacting part of the armature in the direction of the rotation axis. The plate spring includes a pressing part pressing the contact portion on the armature during both the joining and unjoining of the armature and the pulley.

14 Claims, 14 Drawing Sheets

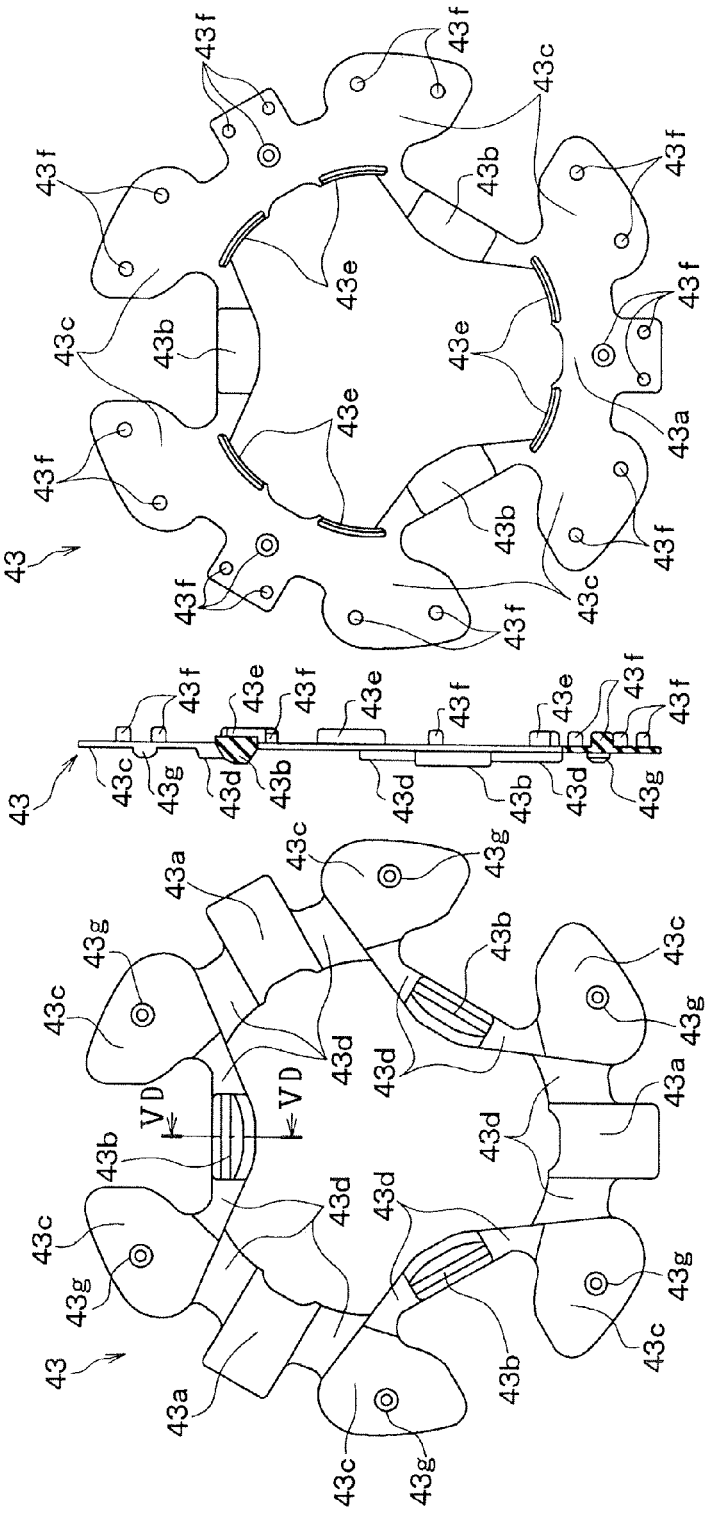

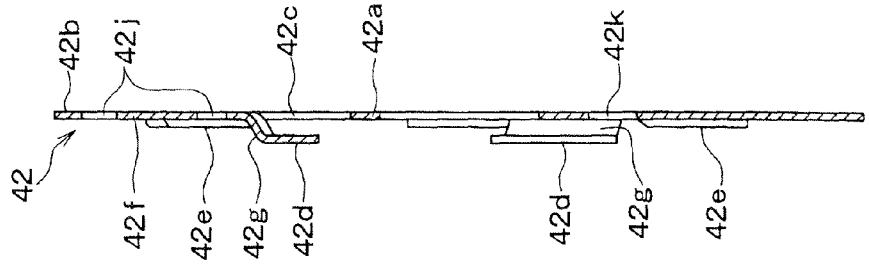
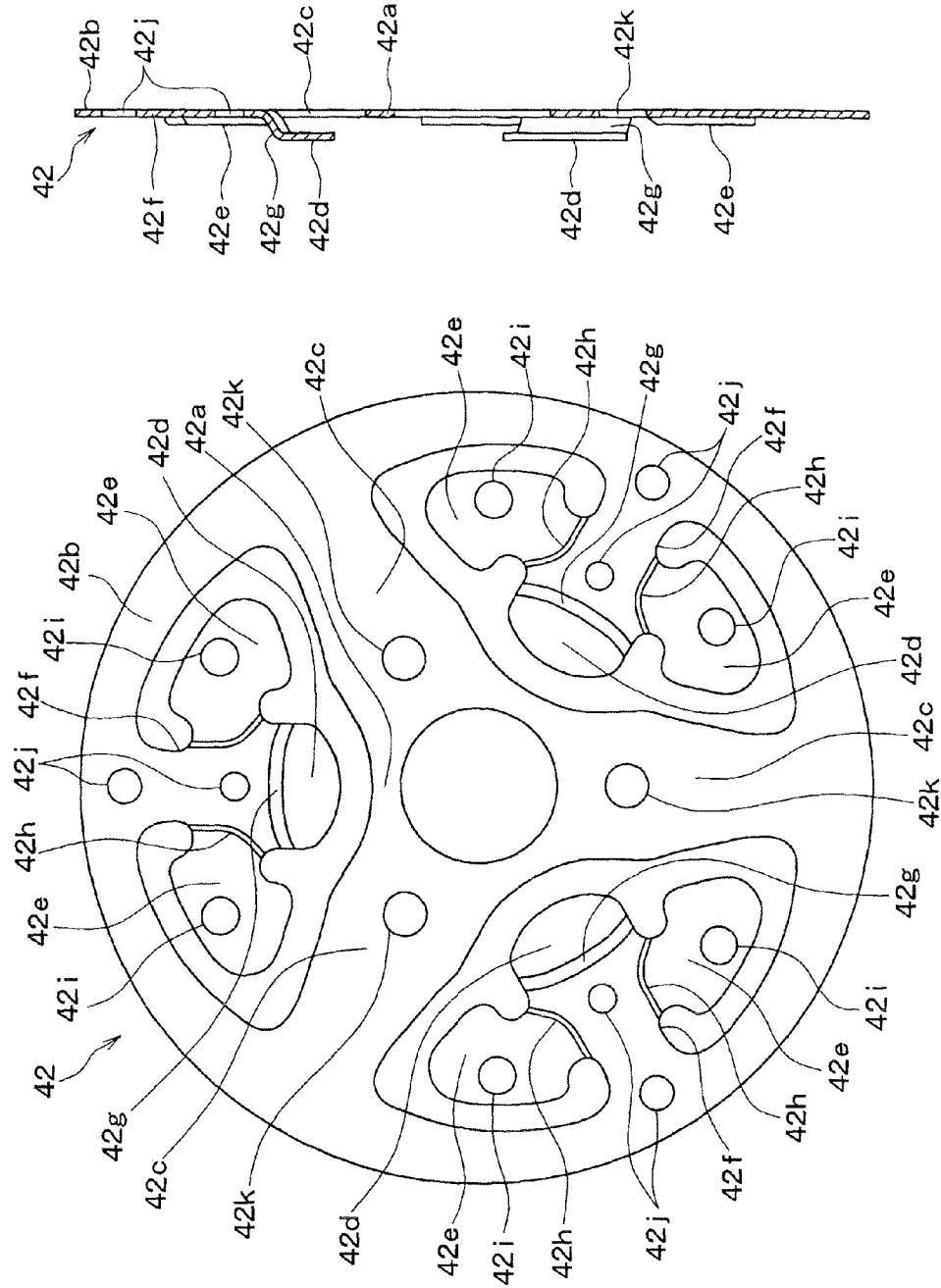

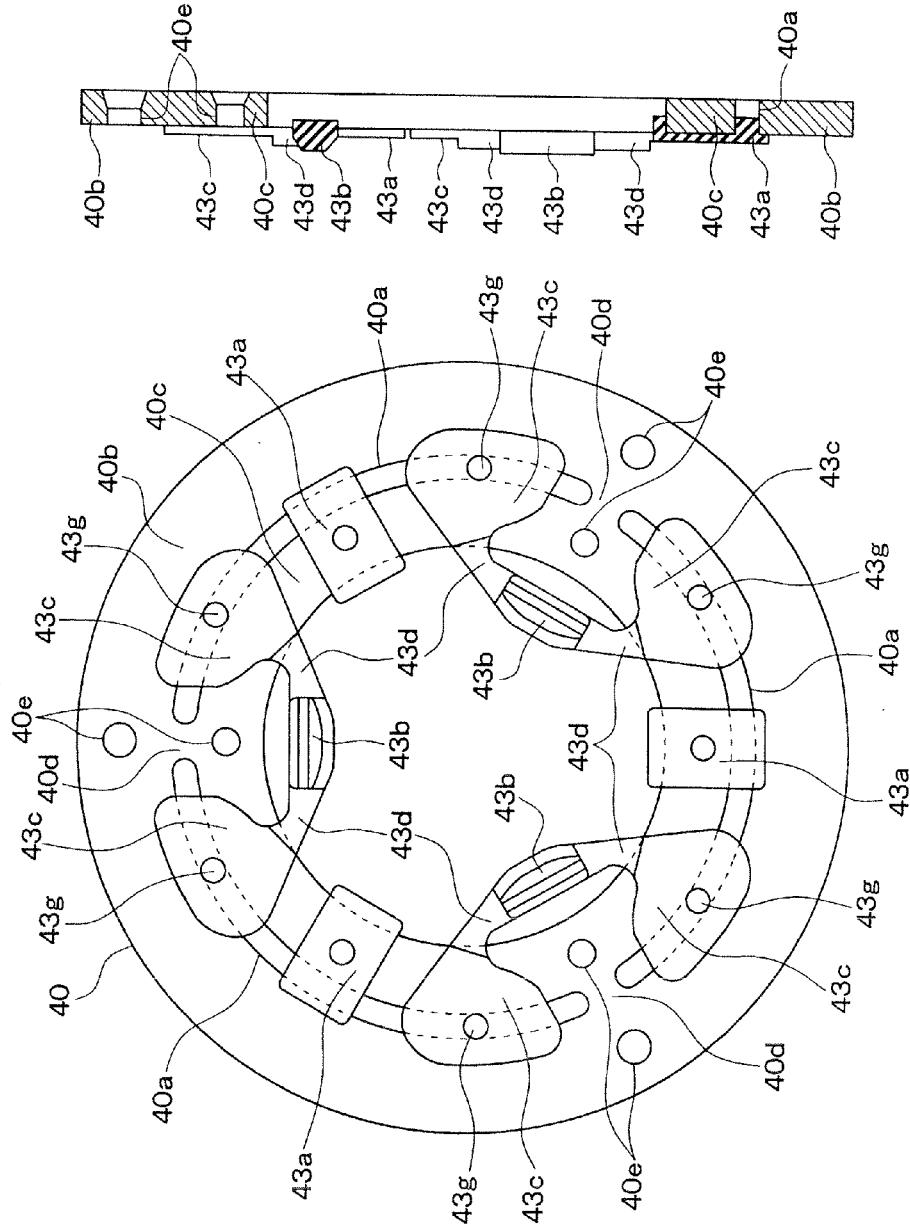

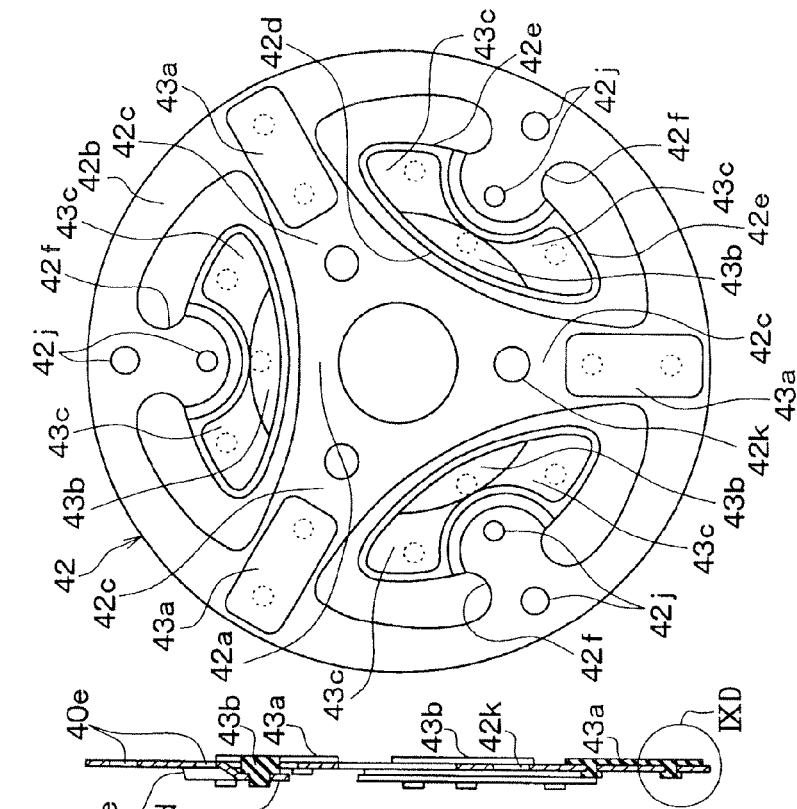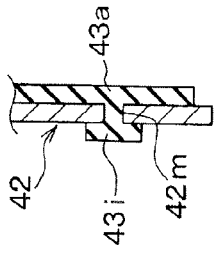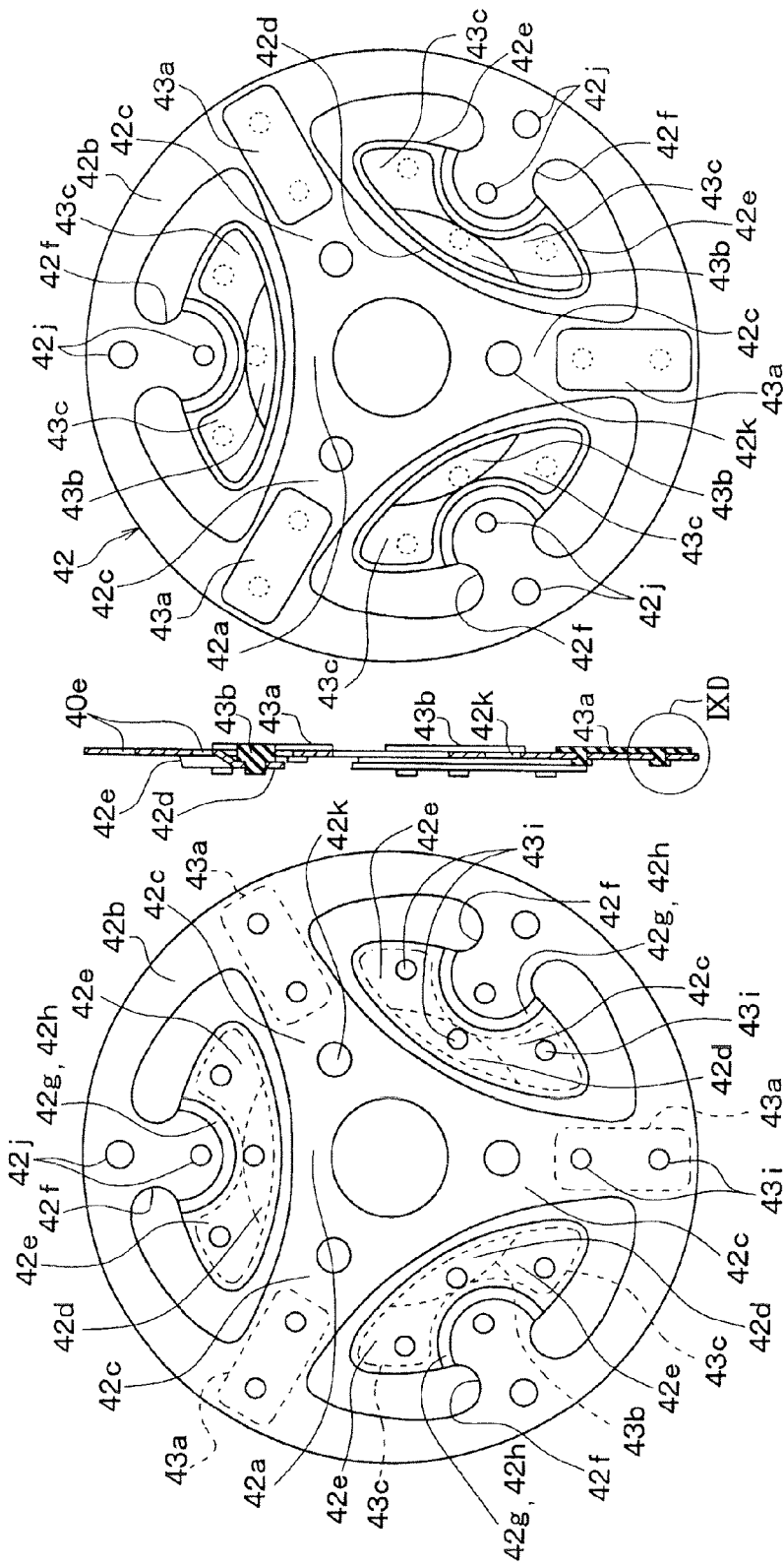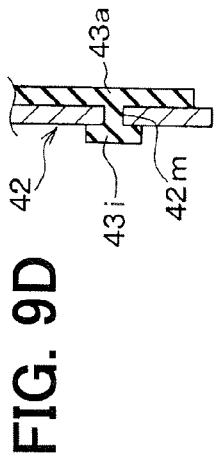

CLUTCH MECHANISM

CROSS REFERENCE TO RELATED APPLICATION

This application is based on and incorporates herein by reference Japanese Patent Application No. 2009-271475 filed on Nov. 30, 2009.

BACKGROUND OF THE INVENTION

1. Field of the Invention

The present invention relates to a clutch mechanism that turns on and off transmission of rotative power.

2. Description of Related Art

Conventionally, as a clutch mechanism of this kind, a plate spring hub type clutch mechanism that uses a plate spring for turning on and off of transmission of rotational driving force from a rotor, which is a driving side rotating body, to an armature, which is a driven side rotating body, is known (e.g., JP-A-2003-247565 corresponding to U.S.2003/0159901A1).

In the plate spring hub type clutch mechanism, upon energization of an electromagnet, the armature is attracted and coupled to the rotor-side, so that the rotational driving force is transmitted, and when the energization of the electromagnet is stopped, the armature is detached from the rotor by resilient force (repulsive force) of the plate spring, so that the transmission of rotational driving force is interrupted.

More specifically, the armature and an inner hub are joined together via the plate spring, and the armature is displaced in a direction away from the rotor by the resilient force of the plate spring.

Because of growing needs of low NV (vibration noise) and low cost in recent years, reduction of an operating noise of the plate spring hub type clutch mechanism having a simple configuration offers highly promising prospects.

In the conventional technology of JP-A-2003-247565, for example, a rubber member is disposed between the inner hub and the plate spring. By mitigating an impact when the armature is attracted to the rotor side and the armature thereby collides with the rotor by the rubber member, the operating noise is reduced.

On the other hand, conventionally, a rubber hub type clutch mechanism is also known (e.g., JP-UM-A-62-167936). The rubber hub type clutch mechanism obtains the repulsive force for detaching the armature from the rotor by the rubber member instead of the plate spring.

In the conventional technology of JP-UM-A-62-167936, a hub plate is joined to the armature, and the hub plate and the inner hub are joined together via an annular rubber member. By resilient force (repulsive force) of the rubber member, the armature and the hub plate are displaced in a direction away from the rotor.

In JP-UM-A-62-167936, it is described that the operating noise is reduced as a result of a projection portion formed on the outer diameter side of the rubber member integrally with the rubber member being placed between the hub plate and the armature.

As a result of in-depth consideration of the present inventors, it has turned out that the operating noise when the armature is attracted to the rotor is further reduced by limiting vibration of the armature immediately after the collision with the rotor.

However, in the above conventional technology of JP-A-2003-247565, the impact at the time of collision between the armature and the rotor is only mitigated, and vibration of the armature immediately after the collision cannot be limited. Therefore, reduction of the operating noise is insufficient.

On the other hand, the above conventional technology of JP-UM-A-62-167936 relates to the rubber hub type clutch mechanism. The rubber hub type clutch mechanism has different basic configuration from the plate spring hub type clutch mechanism. Thus, the configuration of the above conventional technology of JP-UM-A-62-167936 cannot be simply applied to the plate spring hub type clutch mechanism.

SUMMARY OF THE INVENTION

The present invention addresses at least one of the above disadvantages.

According to the present invention, there is provided a clutch mechanism adapted for a drive source. The clutch mechanism includes a driving side rotating body, a driven side rotating body, an electromagnet, a plate spring, and a damper. The driving side rotating body is rotated by rotational driving force from the drive source. The driven side rotating body is joined to the driving side rotating body in a direction of a rotation axis of the driving side rotating body so that the rotational driving force is transmitted to the driven side rotating body. The electromagnet generates attracting magnetic force, which attracts the driven side rotating body in a joining direction in which the driven side rotating body is joined to the driving side rotating body. The plate spring is configured to generate resilient force, which urges the driven side rotating body in an opposite direction from the joining direction. The damper is made of a resilient member and includes an impact mitigation part configured to mitigate an impact when the driven side rotating body collides with the driving side rotating body. The driving side rotating body, the driven side rotating body, the damper, and the plate spring are arranged in this order in the direction of the rotation axis. The damper includes a contact portion that is in contact with a part of the driven side rotating body in the direction of the rotation axis. The plate spring includes a pressing part that is configured to press the contact portion on the driven side rotating body both at a time of joining and at a time of unjoining between the driven side rotating body and the driving side rotating body.

BRIEF DESCRIPTION OF THE DRAWINGS

The invention, together with additional objectives, features and advantages thereof, will be best understood from the following description, the appended claims and the accompanying drawings in which:

FIG. 5A is a front view illustrating a damper in FIG. 2;

FIG. 5B is a side view illustrating the damper in FIG. 2;

FIG. 5C is a back view illustrating the damper in FIG. 2;

FIG. 5D is an enlarged sectional view illustrating the damper in FIG. 2;

FIG. 6A is a front view illustrating a plate spring in FIG. 2;

FIG. 6B is a side view illustrating the plate spring in FIG. 2;

FIG. 7A is a front view illustrating an armature and a damper in accordance with a second embodiment of the invention;

FIG. 7B is a sectional view illustrating the armature and the damper in accordance with the second embodiment;

FIG. 9A is a front view illustrating a plate spring and a damper in accordance with a third embodiment of the invention;

FIG. 9B is a sectional view illustrating the plate spring and the damper in accordance with the third embodiment;

FIG. 9C is a back view illustrating the plate spring and the damper in accordance with the third embodiment;

FIG. 9D is a partially enlarged view illustrating the plate spring and the damper in accordance with the third embodiment;

DETAILED DESCRIPTION OF THE INVENTION

First Embodiment

Figure 1:
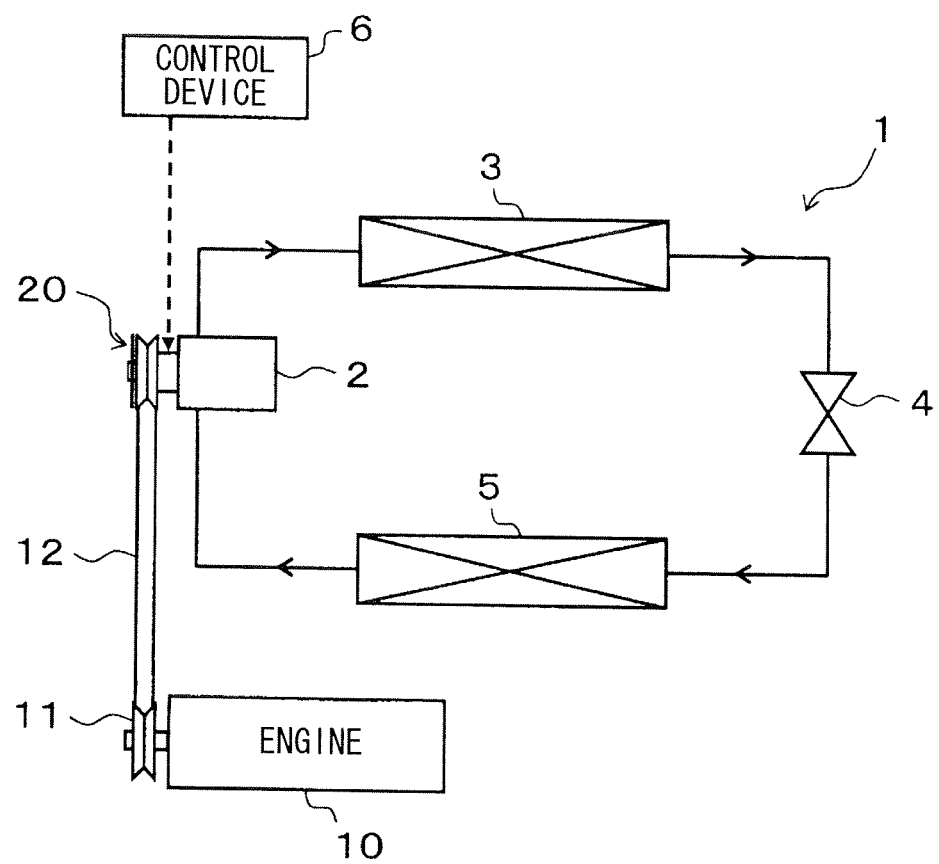
FIG. 1 is a diagram illustrating an entire configuration of a refrigeration cycle system to which a clutch mechanism in accordance with a first embodiment of the invention is applied.

A first embodiment of the invention will be described with reference to FIGS. 1 to 6B. FIG. 1 is a diagram illustrating an entire configuration of a refrigeration cycle system 1 of an air conditioner for a vehicle, to which a clutch mechanism of the present embodiment is applied. The refrigeration cycle system 1 is a refrigerant circulation circuit that includes a compressor 2, a radiator 3, an expansion valve 4 and an evaporator 5, which are connected in series.

The compressor 2 suctions and compresses refrigerant. The radiator 3 makes the refrigerant discharged from the compressor 2 release heat. The expansion valve 4 decompresses and expands the refrigerant flowing out from the radiator 3. The evaporator 5 evaporates the refrigerant decompressed by the expansion valve 4 to produce an endothermic effect.

The compressor 2 obtains rotational driving force from an engine 10, which is a drive source that outputs driving force for vehicle traveling, to rotate a compression mechanism. Accordingly, the compressor 2 suctions and compresses the refrigerant. Any of a fixed volume type compression mechanism having a fixed discharging volume, and a variable volume type compression mechanism configured such that the discharging volume is adjustable by a control signal from the outside, may be employed as the compression mechanism.

The rotational driving force of the engine 10 is transmitted to the compressor 2 through an engine side pulley 11 coupled with a rotation shaft of the engine 10, a pulley-integrated clutch mechanism 20 coupled with the compressor 2, and a V-belt 12 provided on outer peripheries of the engine side pulley 11 and the clutch mechanism 20.

The clutch mechanism 20 turns on and off transmission of the rotational driving force from the engine 10 to the compressor 2. When the clutch mechanism 20 transmits the rotational driving force of the engine 10 to the compressor 2, the refrigeration cycle system 1 is activated. If the clutch mechanism 20 does not transmit the rotational driving force of the engine 10 to the compressor 2, the refrigeration cycle system 1 is not activated and stops.

Operation control of the clutch mechanism 20 is carried out by a control signal outputted from an air conditioning control device 6 that controls operations of various constituting devices of the refrigeration cycle system 1.

The clutch mechanism 20 includes a pulley 30, an armature 40, and a stator 50.

The pulley 30 is a driving side rotating body that is rotated by the rotational driving force from the engine 10. The armature 40 is a driven side rotating body coupled with a rotatable shaft 2a of the compressor 2. The stator 50 includes an electromagnet 51 that generates attracting magnetic force which couples together the pulley 30 and the armature 40.

Figure 2:
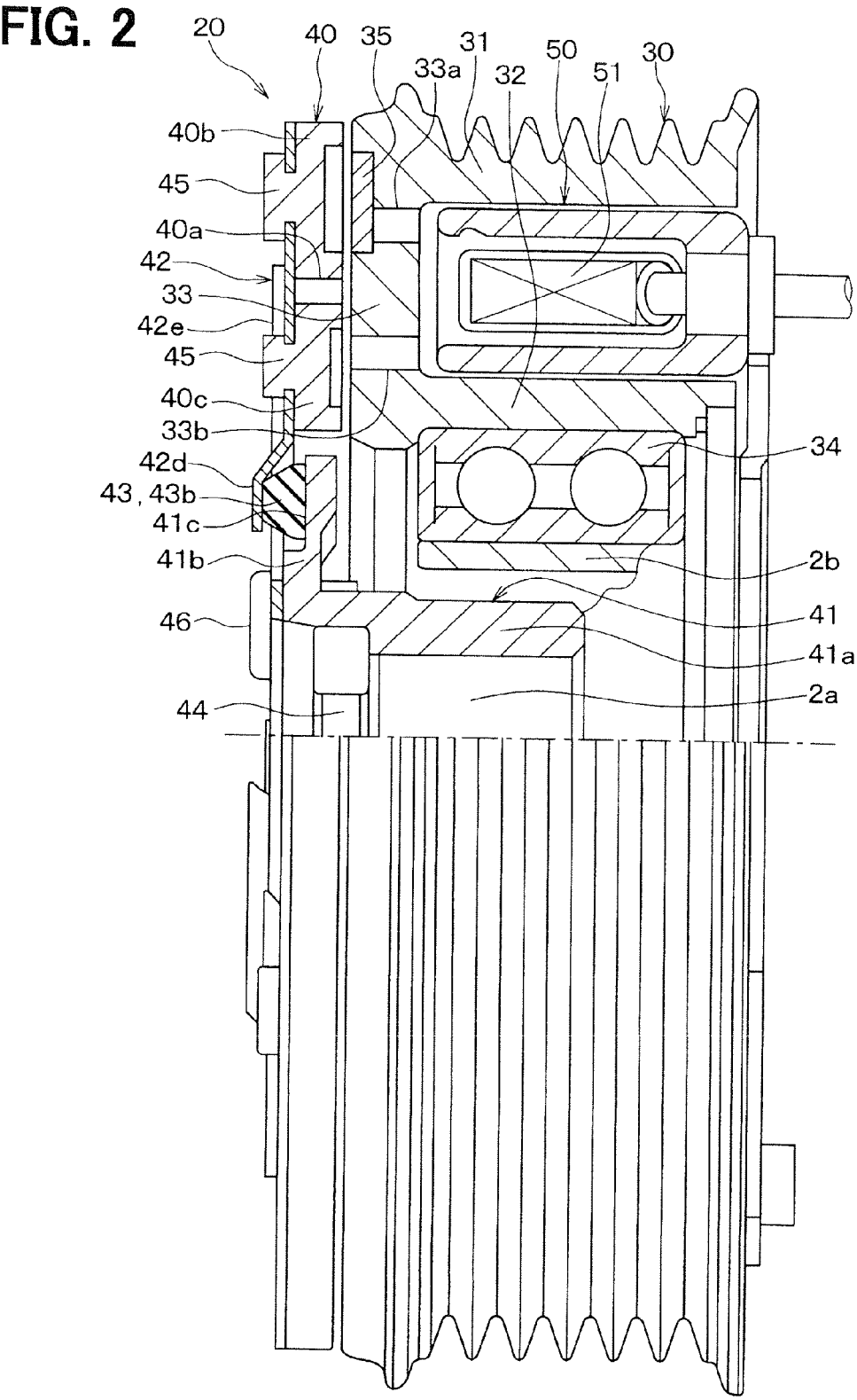
FIG. 2 is a partially sectional view of the clutch mechanism in FIG. 1 along its axial direction, illustrating a state in which a pulley and an armature are detached from each other.
Figure 3:
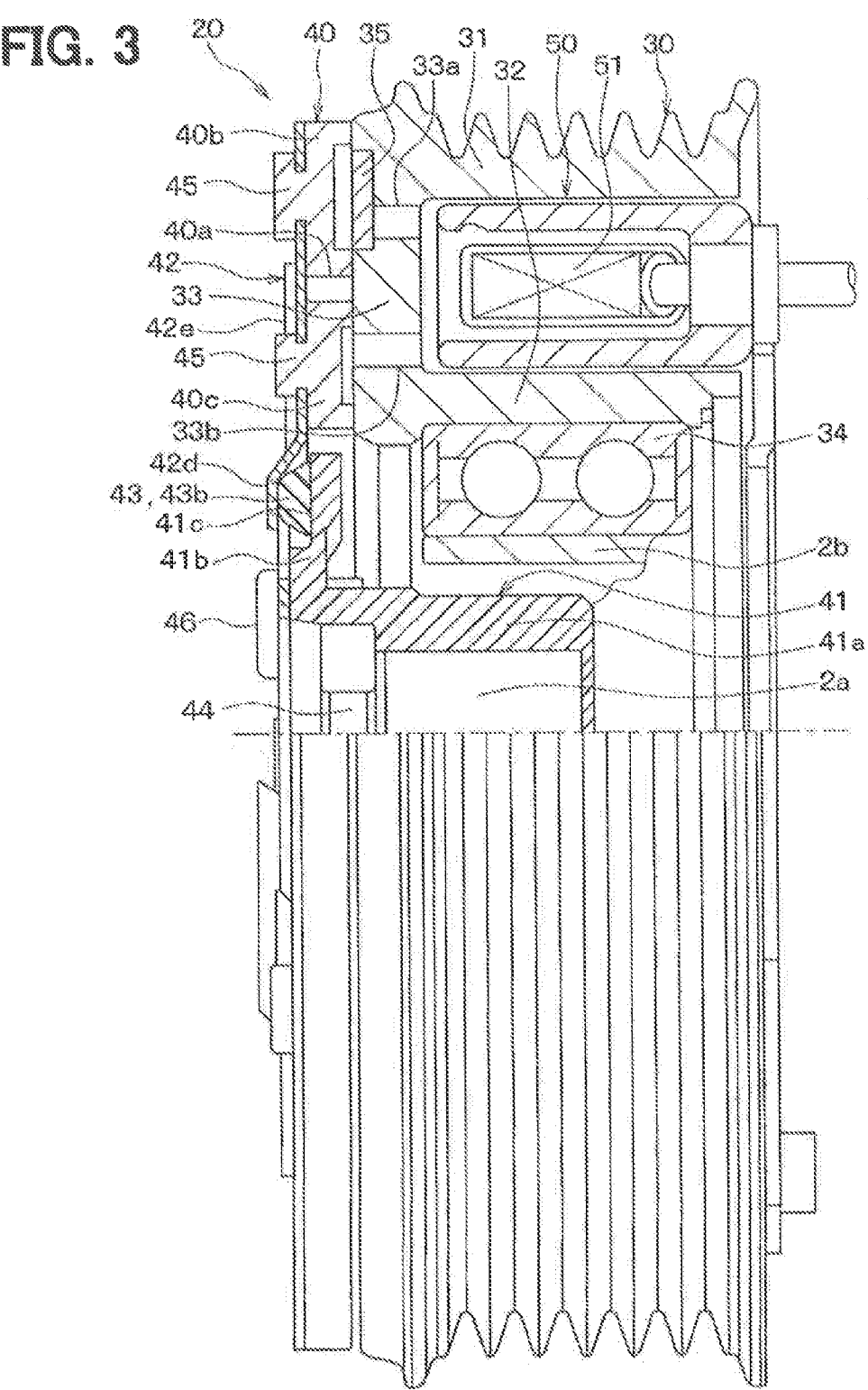
FIG. 3 is a partially sectional view of the clutch mechanism in FIG. 1 along its axial direction, illustrating a state in which the pulley and the armature are coupled.
Figure 4:
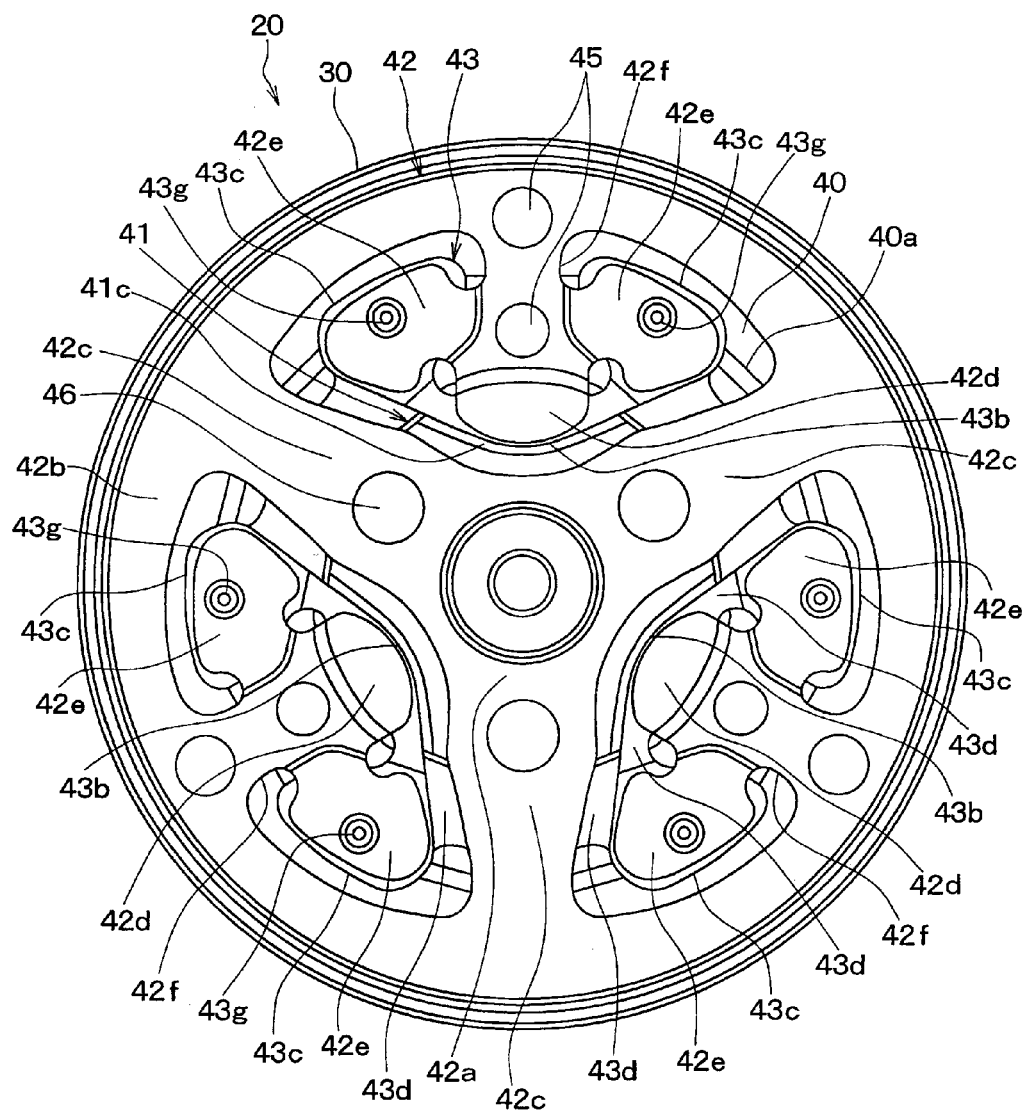
FIG. 4 is a front view illustrating the clutch mechanism in FIG. 1.

When the clutch mechanism 20 couples the pulley 30 and the armature 40, the rotational driving force of the engine 10 is transmitted to the compressor 2. On the other hand, when the clutch mechanism 20 detaches the pulley 30 and the armature 40 from each other, the rotational driving force of the engine 10 is not transmitted to the compressor 2. In FIG. 2, a state in which the pulley 30 and the armature 40 are detached from each other is illustrated. In FIG. 3, a state in which the pulley 30 and the armature 40 are coupled together is illustrated.

The pulley 30 includes an outer cylindrical portion 31, an inner cylindrical portion 32, and an end face part 33, which are integrally formed from magnetic material (e.g., iron). The outer cylindrical portion 31 and the inner cylindrical portion 32 are both cylindrically formed, and the inner cylindrical portion 32 is disposed radially inward of the outer cylindrical portion 31.

The outer cylindrical portion 31 and the inner cylindrical portion 32 are arranged coaxially relative to the rotatable shaft 2a of the compressor 2. A direction parallel to the rotatable shaft 2a (right and left directions in FIGS. 2 and 3) is hereinafter referred to simply as a rotation axis direction. A radial direction of the rotatable shaft 2a (direction perpendicular to the rotatable shaft 2a) is hereinafter referred to simply as a radial direction. A circumferential direction of the rotatable shaft 2a is hereinafter referred to simply as a circumferential direction.

The end face part 33 is formed in a shape of an annular disk that radially connects one end parts (left end parts in FIGS. 2 and 3) of the outer cylindrical portion 31 and the inner cylindrical portion 32 in the rotation axis direction. The outer cylindrical portion 31, the inner cylindrical portion 32, and the end face part 33 constitute part of a magnetic circuit, through which a magnetic flux generated by the electromagnet 51 flows.

A V-groove (more specifically, poly V-groove), on which the V-belt 12 is provided, is formed on an outer peripheral surface of the outer cylindrical portion 31. A ball bearing 34 is fixed on an inner peripheral surface of the inner cylindrical portion 32.

The ball bearing 34 rotatably fixes the pulley 30 relative to a housing (not shown) which serves as an outer shell of the compressor 2. Accordingly, an outer race of the ball bearing 34 is fixed on the inner peripheral surface of the inner cylindrical portion 32, and an inner race of the ball bearing 34 is fixed to a housing boss part 2b provided for the housing of the compressor 2. The housing boss part 2b is formed in a cylindrical shape extending coaxially with the rotatable shaft 2a of the compressor 2.

The end face part 33 includes slit holes 33a, 33b, which pass through the end face part 33, in a shape of a circular arc with the rotatable shaft 2a being its center. The slit holes 33a, 33b are arranged radially in two rows when viewed from the axial direction, and more than one slit hole 33a, 33b are formed in the circumferential direction.

The end face part 33 serves as a friction surface in contact with the armature 40 when the pulley 30 and the armature 40 are coupled together. A friction member 35 is embedded in a surface of the end face part 33 that is in contact with the armature 40.

The friction member 35 is a member for increasing a friction coefficient of the friction surface, and formed from a nonmagnetic material. More specifically, the friction member 35 is formed from a material obtained as a result of hardening alumina using resin, or a sintering material of metal powder (e.g., aluminum powder).

The armature 40 is a member having a shape of an annular disk and disposed coaxially with the rotatable shaft 2a. The armature 40 is integrally formed from a magnetic material (e.g., iron). The armature 40 constitutes part of the magnetic circuit, through which the magnetic flux generated by the electromagnet 51 flows.

The armature 40 includes a slit hole 40a, which passes through the armature 40, in a shape of a circular arc with the rotatable shaft 2a being its center. The slit holes 40a are arranged radially in a single row when viewed from the axial direction, and more than one slit hole 40a are formed in the circumferential direction. A position of the slit hole 40a in the radial direction is located between the radially outward slit hole 33a and the radially inward slit hole 33b in the end face part 33.

A region of the armature 40 having a shape of an annular disk between the slit holes 40a serves as a bridging part 40d (see FIGS. 7A and 7B described in greater detail hereinafter) connecting an outer annular disk part 40b of the armature 40 located radially outward of the slit hole 40a, and an inner annular disk part 40c of the armature 40 located radially inward of the slit hole 40a.

A planar portion of the armature 40 on one end side of the armature 40 in the axial direction (right-hand side in FIGS. 2 and 3) is opposed to the end face part 33 of the pulley 30. The planar portion of the armature 40 serves as a friction surface that is in contact with the pulley 30 when the pulley 30 and the armature 40 are coupled together.

The joining between the armature 40 and the rotatable shaft 2a of the compressor 2 is carried out through an inner hub (hub member) 41 and a plate spring 42. The inner hub 41 includes a cylindrical portion 41a extending in the rotation axis direction, and a flanged portion 41b projecting radially outward in a flanged shape from one end part of a cylindrical portion 41a in the rotation axis direction (left end part in FIGS. 2 and 3). The cylindrical portion 41a is disposed coaxially with the rotatable shaft 2a of the compressor 2. The flanged portion 41b is disposed radially inward of the armature 40 having a shape of an annular disk.

The inner hub 41 is fastened to the rotatable shaft 2a using a bolt hole (not shown) formed in the rotatable shaft 2a of the compressor 2, and a bolt 44. A fastening means, such as a spline (serration) or a key groove, may be employed for the fixation of the inner hub 41 and the rotatable shaft 2a of the compressor 2.

The plate spring 42 is disposed to cover the flanged portion 41b of the inner hub 41 and the armature 40 from their other end sides (left-hand side in FIGS. 2 and 3) in the axial direction. The plate spring 42 is joined to both of the armature 40 and the inner hub 41.

A damper 43, which is constituted of a resilient member (resilient body), is placed between the plate spring 42 and the flanged portion 41b as well as between the plate spring 42 and the armature 40. Accordingly, the pulley 30, the armature 40, the damper 43, and the plate spring 42 are arranged in this order in the rotation axis direction.

As illustrated in FIGS. 5A to 5D, the damper 43 is formed annularly as a whole, and integrally formed from a material such as EPDM (ethylene-propylene-diene terpolymer rubber). More specifically, the damper 43 includes a flexure applying part 43a, an impact mitigation part 43b, and a vibration reduction part 43c. The damper 43 is formed such that these respective parts 43a to 43c are annularly arranged and connected by a connecting part 43d.

The flexure applying part 43a is placed between the plate spring 42 and the armature 40 to serve to give an initial flexure to the plate spring 42.

The impact mitigation part 43b is compressed between the flanged portion 41b of the inner hub 41 and the plate spring 42 to serve to mitigate an impact when the friction surface of the armature 40 collides with the friction surface of the pulley 30.

Thickness of the impact mitigation part 43b is larger than thicknesses of the flexure applying part 43a and the vibration reduction part 43c. The impact mitigation part 43b projects further on both sides in the rotation axis direction (both sides in right and left directions in FIG. 5B) than the flexure applying part 43a and the vibration reduction part 43c.

A receiving part 41c, which is recessed to receive the impact mitigation part 43b, is formed on the flanged portion 41b of the inner hub 41. Accordingly, the thickness of the impact mitigation part 43b is sufficiently ensured. The receiving part 41c which receives the impact mitigation part 43b may be formed integrally with the inner hub 41.

Accordingly, the components count is decreased, and the costs are reduced.

A section of the impact mitigation part 43b has a tapered shape, such that reaction force against the amount of displacement of the plate spring 42 becomes nonlinear. More specifically, the sectional shape of the impact mitigation part 43b is a tapered shape expanding from the plate spring 42 side (left-hand side in FIG. 5D) toward the receiving part 41c side (right-hand side in FIG. 5D). Accordingly, as the plate spring 42 is displaced further on the flanged portion 41b side, the reaction force of the impact mitigation part 43b rapidly becomes larger.

The vibration reduction part 43c serves as a contact portion that is in contact with a part of armature 40 in the rotation axis direction. More specifically, the vibration reduction part 43c is pressed against the armature 40 in the rotation axis direction by the plate spring 42. The vibration reduction part 43c serves to reduce vibration of the armature 40 after the friction surface of the armature 40 collides with the friction surface of the pulley 30.

A projection 43e engaged with an inner circumferential edge of the armature 40, and a projection 43f inserted into a hole (not shown) formed in the armature 40 or into the slit hole 40a are formed on a surface of the damper 43 facing the armature 40.

These projections 43e, 43f serve as the positioning when the damper 43 is attached to the armature 40. In addition, the projections 43e, 43f serve also to limit radially outward expansion of the damper 43 because of centrifugal force when the armature 40 and the pulley 30 are coupled and integrally rotated.

As illustrated in FIGS. 6A and 6B, the plate spring 42 has a shape of a circular disk as a whole, and is integrally formed from a resilient metal material. More specifically, the plate spring 42 includes an inner circumferential portion 42a, which overlaps with the flanged portion 41b of the inner hub 41, an outer circumferential portion 42b, which overlaps with the armature 40, and arm portions 42c (three arm portions 42c in the example of FIG. 6A), each of which radially connects the inner circumferential portion 42a and the outer circumferential portion 42b.

The arm portions 42c extend radially at regular angular intervals from the inner circumferential portion 42a to the outer circumferential portion 42b. A region of the arm portion 42c on the outer circumferential portion 42b side overlaps with the flexure applying part 43a of the damper 43. Accordingly, the initial flexure is given to the plate spring 42.

Furthermore, a linguiform portion 42f extending in a linguiform shape radially inward from a region of the outer circumferential portion 42b located between the arm portions 42c is provided for the plate spring 42. The linguiform portion 42f includes a compression part 42d, which compresses the impact mitigation part 43b of the damper 43 toward the inner hub 41, and a pressing part 42e, which presses the vibration reduction part 43c of the damper 43 on the armature 40.

Accordingly, the vibration reduction part 43c and the pressing part 42e are provided effectively using a space between the arm portions 42c. As a result, the increase of size of the clutch mechanism 20 in accordance with the formation of the vibration reduction part 43c and the pressing part 42e is limited.

More specifically, the linguiform portion 42f has a shape branching in three directions, i.e., radially inward, and both sides in the circumferential direction of the plate spring 42. The part of the linguiform portion 42f that extends radially inward serves as the compression part 42d, and the part of the linguiform portion 42f that extends on both sides in the circumferential direction serves as the pressing part 42e. In other words, the compression part 42d and the pressing part 42e are formed so as to connect with the outer circumferential portion 42b.

The plate spring 42 is formed into a shape of a flat plate except for the compression part 42d and the pressing part 42e. The compression part 42d and the pressing part 42e are punched out further on the opposite side from the damper 43 than the remaining part having the shape of a flat plate, to secure thicknesses of the impact mitigation part 43b and the vibration reduction part 43c of the damper 43.

Accordingly, a stepped portion 42g is formed at a region of the linguiform portion 42f at a root of the compression part 42d, and a stepped portion 42h is formed also at a region of the linguiform portion 42f at a root of the pressing part 42e. These stepped portions 42g, 42h serve also to ensure rigidity of the compression part 42d and the pressing part 42e.

Accordingly, thickness of the vibration reduction part 43c is secured, and rigidity of the pressing part 42e is increased, so that the vibration reduction part 43c is reliably compressed. As a result, vibration of the armature 40 is effectively reduced, and eventually, the operating noise is further reduced.

The stepped portion 42g located at the root portion of the compression part 42d serves also to prevent the radially outward expansion of the damper 43 due to the centrifugal force when the armature 40 and the pulley 30 are coupled and integrally rotated.

The pressing part 42e constantly presses the vibration reduction part 43c of the damper 43 with a predetermined crushing allowance. In other words, the pressing part 42e presses the vibration reduction part 43c of the damper 43 with a predetermined load both at the time of coupling between the armature 40 and the pulley 30 and at the time of uncoupling between the armature 40 and the pulley 30.

A hole 42i, into which a projection 43g that is formed on the vibration reduction part 43c of the damper 43 is inserted, is provided for the pressing part 42e. At the time of attachment of the plate spring 42 and the damper 43, positioning between the plate spring 42 and the damper 43 is carried out by inserting the projection 43g of the damper 43 into the hole 42i of the pressing part 42e.

The plate spring 42 includes a rivet hole 42j for its coupling with the armature 40 and a rivet hole 42k for its coupling with the inner hub 41. The rivet hole 42j for the coupling between the armature 40 and the plate spring 42 is formed at a boundary part between the outer circumferential portion 42b and the linguiform portion 42f and at a generally central part of the linguiform portion 42f. More specifically, the rivet hole 42j at the generally central part of the linguiform portion 42f is formed at a position generally equal distances away from the compression part 42d and the pressing part 42e.

The rivet hole 42k for the coupling between the inner hub 41 and the plate spring 42 is formed near a boundary part between the inner circumferential portion 42a and the arm portion 42c.

At the time of attachment of the plate spring 42 to the armature 40 and the inner hub 41, rivets 45, 46 (FIGS. 2 and 3) are inserted into the rivet holes 42j, 42k of the plate spring 42, and then front end portions of the rivets 45, 46 are crushed. Accordingly, the plate spring 42 is joined to the armature 40 and the inner hub 41. In the present embodiment, as illustrated in FIGS. 2 and 3, the rivet 45 for joining the plate spring 42 to the armature 40 is formed integrally with the armature 40.

Accordingly, the components count is decreased, and the costs are reduced.

As illustrated in FIGS. 2 and 3, the stator 50 having the electromagnet 51 is fixed to the housing (not shown) of the compressor 2 via an annular stator plate 56. Since a clearance is provided between the stator 50 and the pulley 30, contact of the pulley 30 with the stator 50 is prevented even though the pulley 30 rotates.

An operation of the clutch mechanism 20 having the above-described configuration in accordance with the present embodiment will be described. When the pulley 30 and the armature 40 are coupled together, the air conditioning control device 6 of the air conditioner for a vehicle supplies electricity to the electromagnet 51. Accordingly, the magnetic flux generated by the electromagnet 51 flows through two magnetic circuits.

One magnetic circuit of the two magnetic circuits is a magnetic circuit, through which the magnetic flux by the electromagnet 51 passes in the order of the end face part 33, the armature 40, and the outer cylindrical portion 31. The other magnetic circuit is a magnetic circuit through which the magnetic flux by the electromagnet 51 passes in the order of the end face part 33, the armature 40, and the inner cylindrical portion 32.

Attracting magnetic force that is greater than resilient force (repulsive force) of the damper 43 is generated in these magnetic circuits. Accordingly, as in FIG. 3, the armature 40 is attracted toward the pulley 30, so that the armature 40 is coupled with the pulley 30. As a result, the rotational driving force from the engine 10 is transmitted to the compressor 2.

When the pulley 30 and the armature 40 are detached, the air conditioning control device 6 of the air conditioner for a vehicle stops the supply of electricity to the electromagnet 51. Accordingly, the attracting magnetic force of the magnetic circuits disappears. As a result, as in FIG. 2, the armature 40 is urged and displaced in a direction (opposite direction from the coupling direction) in which the armature 40 separates from the pulley 30 due to resilient force of the plate spring 42.

In other words, a clearance having a predetermined interval is formed between the armature 40 and the pulley 30, and the armature 40 is detached from the pulley 30. As a result, the rotational driving force from the engine 10 is not transmitted to the compressor 2.

In the present embodiment, the impact mitigation part 43b of the damper 43 is disposed between the inner hub 41 and the plate spring 42. Accordingly, the impact when the armature 40 collides with the pulley 30 is mitigated.

Specifically, when the armature 40 is attracted toward the pulley 30, the outer circumferential portion 42b of the plate spring 42 is also displaced toward the pulley 30 together with the armature 40. In this case, the compression part 42d of the plate spring 42 is also displaced toward the pulley 30 together with the outer circumferential portion 42b. Accordingly, as in FIG. 3, the impact mitigation part 43b is compressed by the compression part 42d, so that the resilient force (repulsive force) of the impact mitigation part 43b is made large. Therefore, the impact when the friction surface of the armature 40 collides with the friction surface of the pulley 30 is mitigated by the impact mitigation part 43b.

In the present embodiment, the pressing part 42e of the plate spring 42 presses the vibration reduction part 43c of the damper 43 against the armature 40. Accordingly, the vibration of the armature 40 after the friction surface of the armature 40 collides with the friction surface of the pulley 30 is reduced by the vibration reduction part 43c.

As a result, an operating noise when the pulley 30 and the armature 40 are coupled is reduced.

Moreover, in the present embodiment, the rigidity of the compression part 42d and the pressing part 42e is increased by the stepped portions 42g, 42h of the plate spring 42. Accordingly, the impact mitigation part 43b of the damper 43 is reliably compressed, and the vibration reduction part 43c of the damper 43 is reliably pressed. Eventually, the operating noise is reduced reliably.

Additionally, in the present embodiment, the slit holes 33a, 33b, 40a are formed in the end face part 33 of the pulley 30 and the armature 40. Accordingly, magnetoresistance of the above-described magnetic circuit is decreased. Eventually, magnetic force generated by this magnetic circuit is increased.

Second Embodiment

In the above first embodiment, the damper 43 is formed separately from the armature 40. In a second embodiment of the invention, as illustrated in FIGS. 7A and 7B, a damper 43 is formed integrally with the armature 40.

As a method for forming the damper 43 integrally with the armature 40, insert molding, for example, is employed. Because of the formation of the damper 43 integrally with the armature 40, the connecting part 43d of the damper 43 in the first embodiment is partly omitted. Specifically, a connecting part 43d connecting a flexure applying part 43a and a vibration reduction part 43c is no longer used.

Because both the flexure applying part 43a and the vibration reduction part 43c overlap with the armature 40, the connecting part 43d connecting the flexure applying part 43a and the vibration reduction part 43c does not need to be formed in the present embodiment. On the other hand, an impact mitigation part 43b which overlaps with an inner hub 41 is disposed on an inner circumferential side of the armature 40. Accordingly, a connecting part 43d connecting the impact mitigation part 43b with the vibration reduction part 43c is necessary in the present embodiment as well.

In the present embodiment, the damper 43 is formed integrally with the armature 40. Accordingly, man hours for attachment of the damper 43 and the armature 40 are reduced, and eventually, the costs are reduced.

Figure 8:
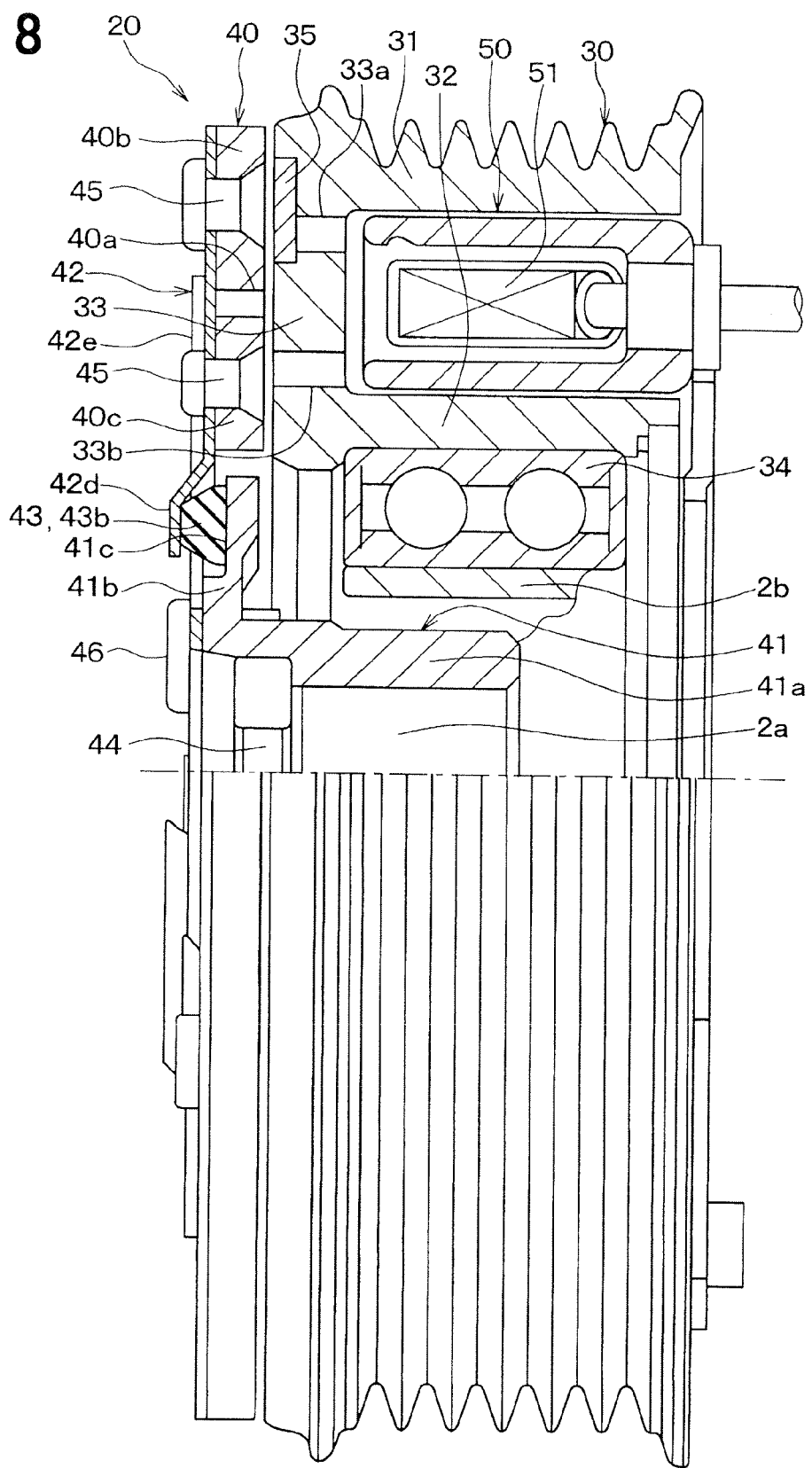
FIG. 8 is a partially sectional view of a clutch mechanism along its axial direction in accordance with the second embodiment.

In the first embodiment, the rivet 45 for fastening the armature 40 and the plate spring 42 together is formed integrally with the armature 40. In the present embodiment, as illustrated in FIGS. 7A to 8, a rivet 45 is formed separately from the armature 40, and a rivet hole 40e is provided in the armature 40.

At the time of attachment of the plate spring 42 to the armature 40, the rivet 45 is inserted into the rivet hole 40e (FIGS. 7A and 7B) of the armature 40 and a rivet hole 42j of the plate spring 42, and then a front end portion of the rivet 45 is crushed. Accordingly, the plate spring 42 is joined to the armature 40.

Third Embodiment

In the above second embodiment, the damper 43 is formed integrally with the armature 40. In a third embodiment of the invention, as illustrated in FIG. 9A to 9D, a damper 43 is formed integrally with a plate spring 42.

As a method for forming the damper 43 integrally with the armature 40, insert molding, for example, is employed. In the example of FIGS. 9A to 9D, in order to facilitate forming of the damper 43, an impact mitigation part 43b and a vibration reduction part 43c of the damper 43 are formed in an elliptical integrated shape, and a compression part 42d and a pressing part 42e of the plate spring 42 are also formed in an elliptical integrated shape. As a result, stepped portions 42g, 42h of the plate spring 42 are formed in an arc-shaped integrated shape.

As illustrated in FIG. 9D, a retaining structure using a gate at the time of forming of the damper 43 is formed at an overlapping portion between the damper 43 and the plate spring 42. More specifically, when the damper 43 is formed, a rubber material for the damper 43 is injected through a hole 42m formed at a region of the plate spring 42 that overlaps with the damper 43, and the rubber material is further injected such that a retaining head portion 43i having a larger diameter than the hole 42m is formed. Accordingly, the damper 43 and the plate spring 42 are surely fixed together without bonding.

In the present embodiment, the damper 43 is formed integrally with the plate spring 42. Accordingly, man hours for attachment between the damper 43 and the plate spring 42 are reduced, and eventually, costs are reduced.

Fourth Embodiment

Figure 10:
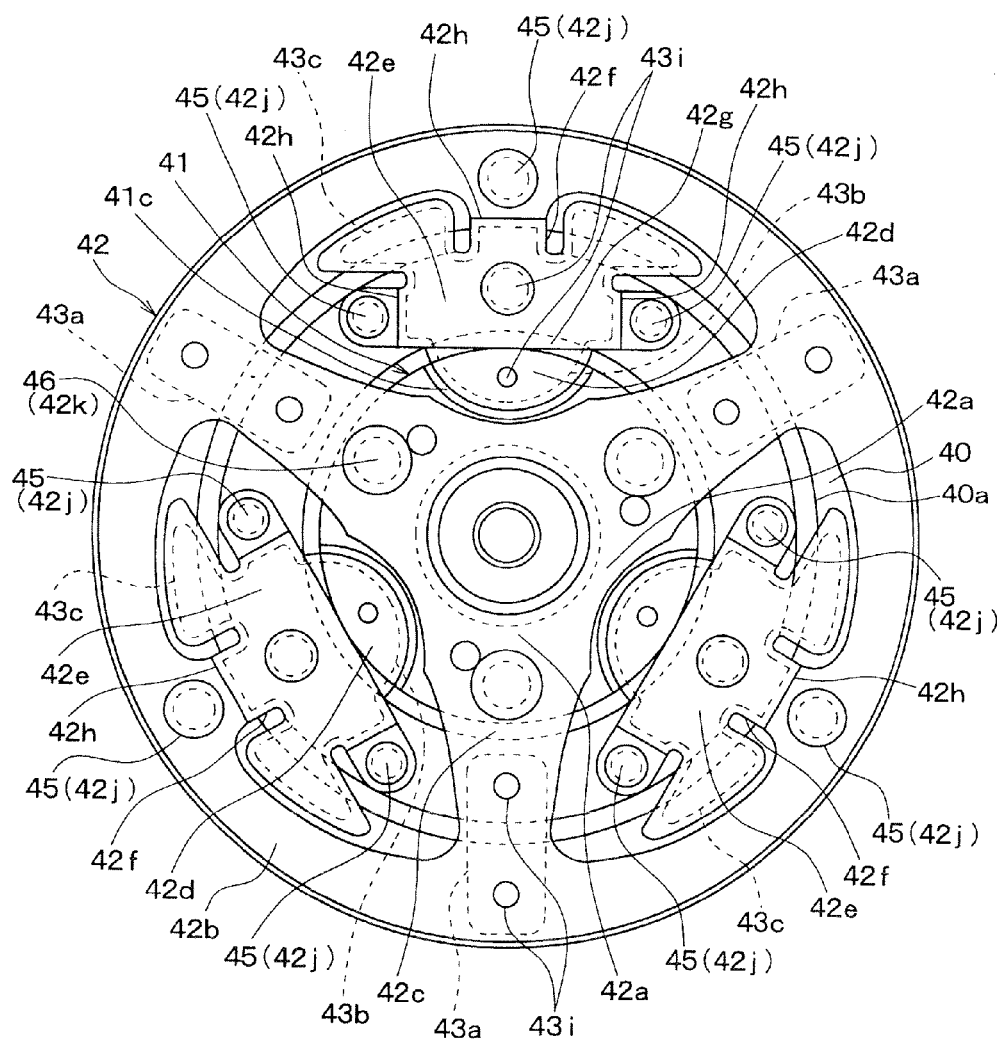
FIG. 10 is a front view illustrating a clutch mechanism in accordance with a fourth embodiment of the invention.

In the above third embodiment, at a linguiform portion 42f of the plate spring 42, one joining portion between the plate spring 42 and the armature 40 by means of the rivet hole 42j and the rivet 45 is provided at a generally central part of the linguiform portion 42f. In a fourth embodiment of the invention, as illustrated in FIG. 10, two joining portions 42j, 45 are provided at regions of the linguiform portion 42f on both sides of a pressing part 42e in the circumferential direction.

Accordingly, rigidity of the pressing part 42e is increased, so that the vibration reduction part 43c is reliably compressed. As a result, vibration of the armature 40 is effectively reduced, and eventually, the operating noise is further reduced.

Accordingly, rigidity of the pressing part 42e is easily secured. As a result, areas of the pressing part 42e and a vibration reduction part 43c are made larger. In the example of FIG. 10, the pressing part 42e and the vibration reduction part 43c are enlarged to a root portion of the linguiform portion 42f.

Accordingly, the effect of reducing the vibration of the armature 40 by the vibration reduction part 43c is improved. As a result, the operating noise at the time of coupling of a pulley 30 and the armature 40 is further reduced.

Fifth Embodiment

Figure 11:
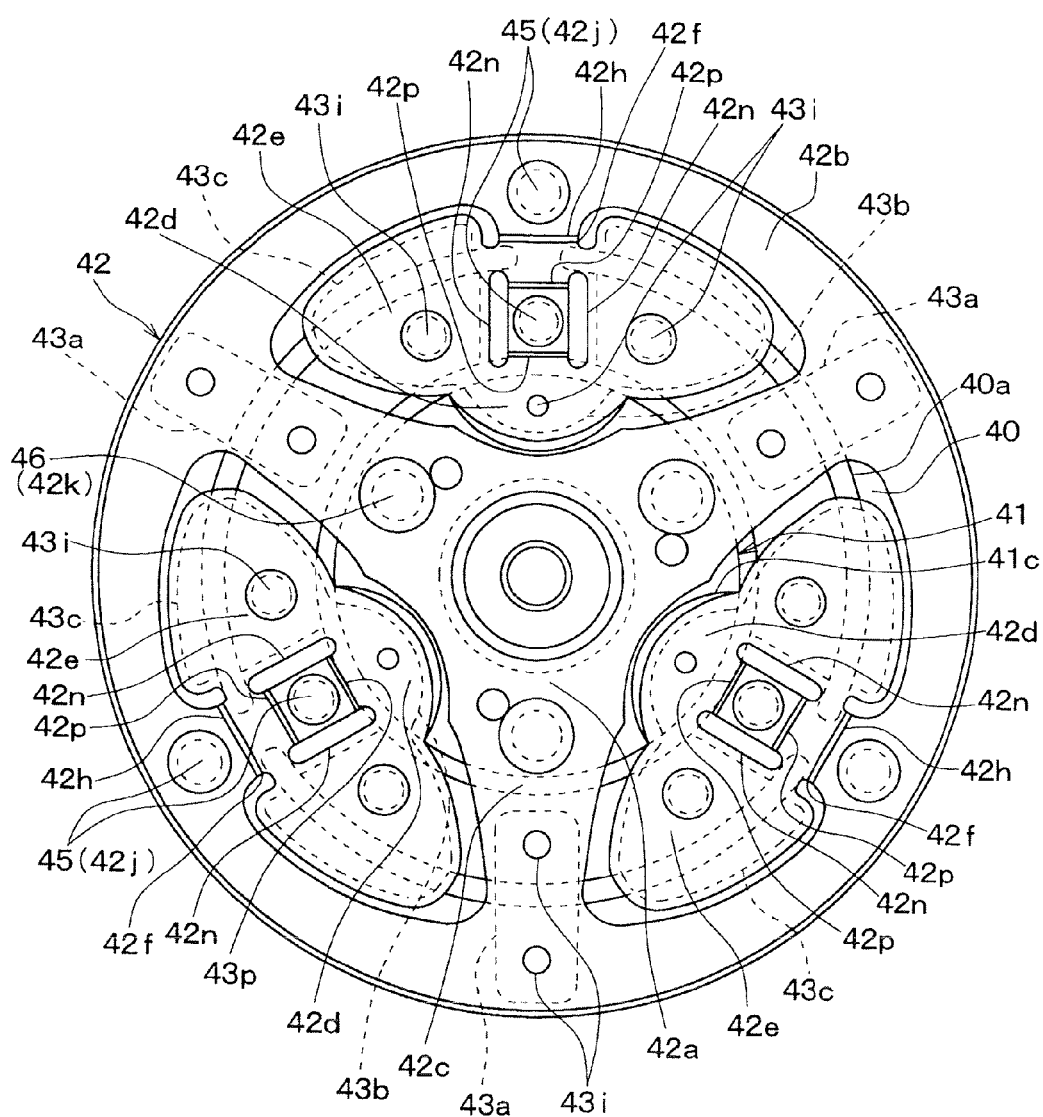
FIG. 11 is a front view illustrating a clutch mechanism in accordance with a fifth embodiment of the invention.

In the above third embodiment, a large area ranging from a region of the linguiform portion 42f near the rivet hole 42j to the root portion is coplanar with the outer circumferential portion 42b. In a fifth embodiment of the invention, as illustrated in FIG. 11, only a region of a linguiform portion 42f near a rivet hole 42j is coplanar with an outer circumferential portion 42b. A root portion of the linguiform portion 42f is punched out on the opposite side from a damper 43.

In the example of FIG. 11, a hole 42n having a slit shape is formed at the region of the linguiform portion 42f near the rivet hole 42j, so that this challenging forming, i.e., only a very small region of the linguiform portion 42f near the rivet hole 42j is made coplanar with an outer circumferential portion 42b; and the remaining region is punched out on the opposite side from the damper 43, is easily carried out.

More specifically, the radially extending slit-shaped hole 42n is formed at regions of the linguiform portion 42f on both sides of the rivet hole 42j in the circumferential direction. Accordingly, stepped portions 42p extending in the circumferential direction are easily formed at regions of the linguiform portion 42f on both sides of the rivet hole 42j in the radial direction.

In the present embodiment, the pressing part 42e and the vibration reduction part 43c are enlarged to the root portion of the linguiform portion 42f. Accordingly, the effect of reducing the vibration of the armature 40 by the vibration reduction part 43c is improved, and eventually, the operating noise at the time of coupling of the pulley 30 and the armature 40 is further reduced.

Sixth Embodiment

Figure 12:
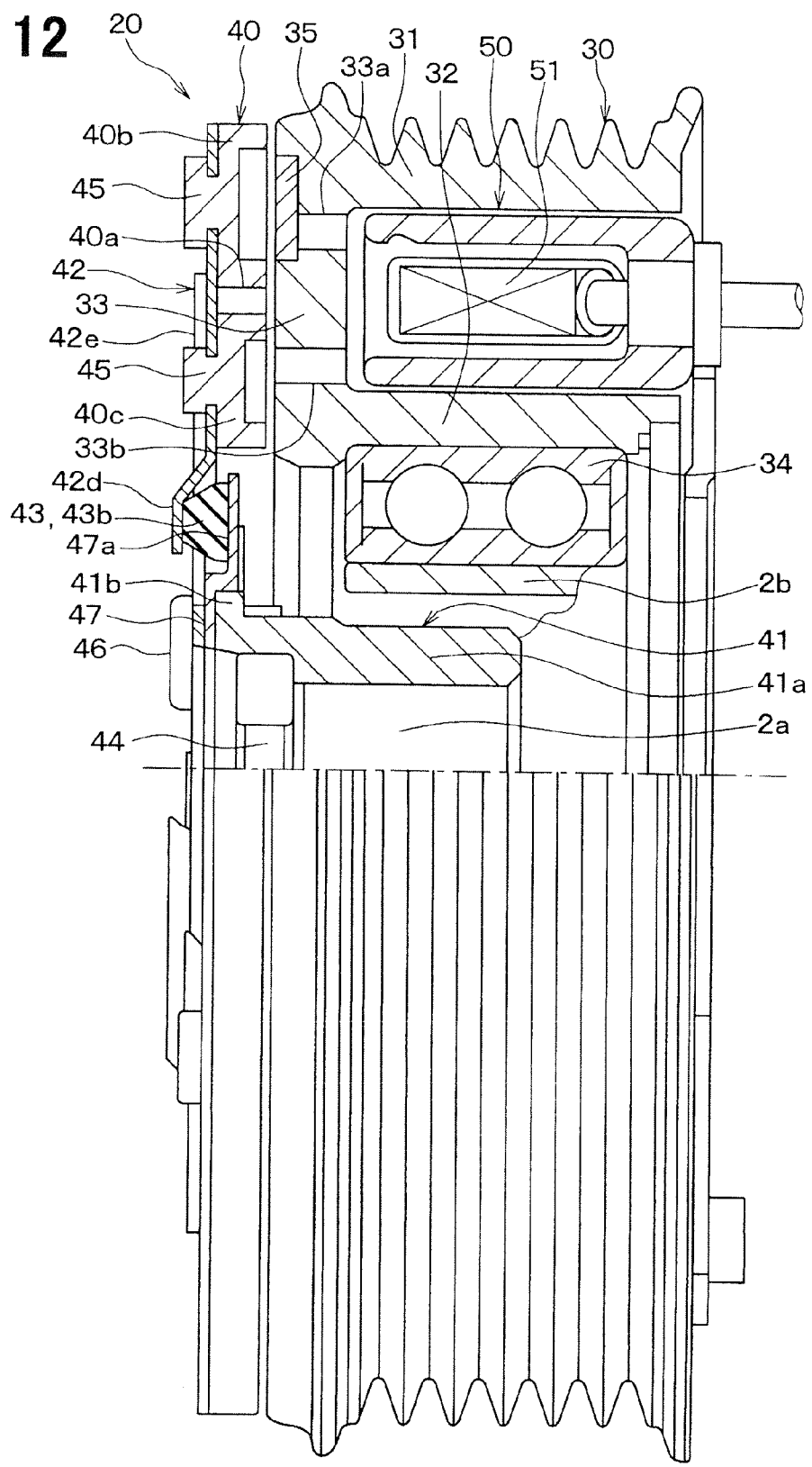
FIG. 12 is a partially sectional view of a clutch mechanism along its axial direction in accordance with a sixth embodiment of the invention.

In the above first embodiment, the impact mitigation part 43b is received by the receiving part 41c formed integrally with the flanged portion 41b of the inner hub 41. Alternatively, in a sixth embodiment of the invention, as illustrated in FIG. 12, by a plate member 47 formed separately from an inner hub 41, an impact mitigation part 43b is received. The plate member 47 may be fixed to the inner hub 41.

Accordingly, an impact mitigation effect by the impact mitigation part 43b is reliably produced.

Figure 13B:
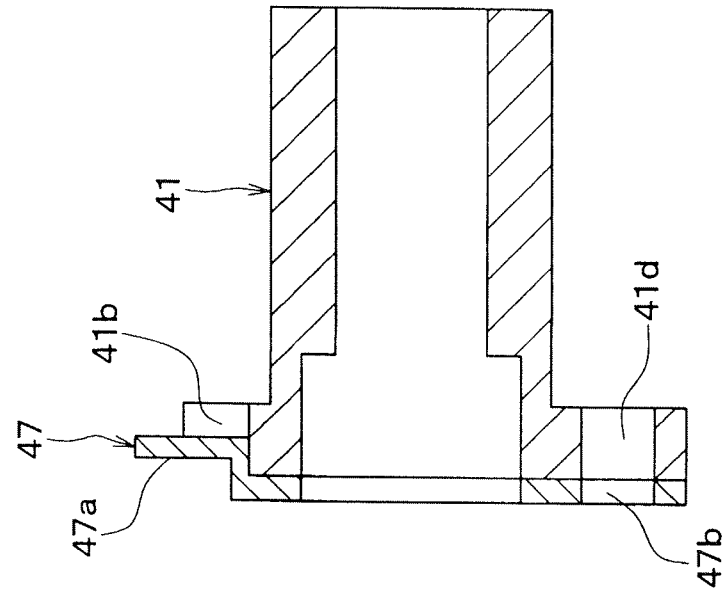
FIG. 13B is a sectional view illustrating the inner hub and the plate member in FIG. 12.
Figure 13A:
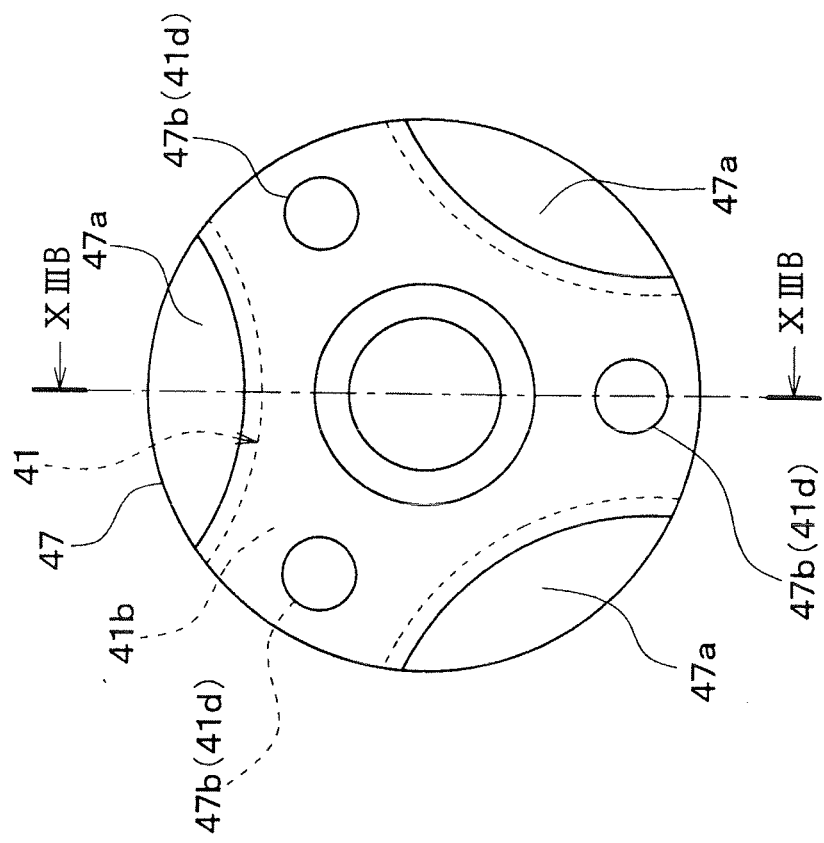
FIG. 13A is a front view illustrating an inner hub and a plate member in FIG. 12.

As illustrated in FIGS. 13A and 13B, a flanged portion 41b of the inner hub 41 is formed such that a portion corresponding to the impact mitigation part 43b is notched. In this example, as illustrated in FIG. 13A, a flat surface shape of the flanged portion 41b is formed in a Y-shaped manner.

The plate member 47 is formed to cover the flanged portion 41b of the inner hub 41. In the example of FIGS. 13A and 13B, a flat surface shape of the plate member 47 is circular, and a receiving part 47a, which is depressed to receive the impact mitigation part 43b, is formed at areas spreading out of the Y-shaped flanged portion 41b. By the above-described structure as well, the impact mitigation part 43b may be received.

In FIGS. 13A and 13B, holes 41d, 47b formed on the inner hub 41 and the plate member 47 are rivet holes for the coupling with a plate spring 42.

Seventh Embodiment

Figure 14:
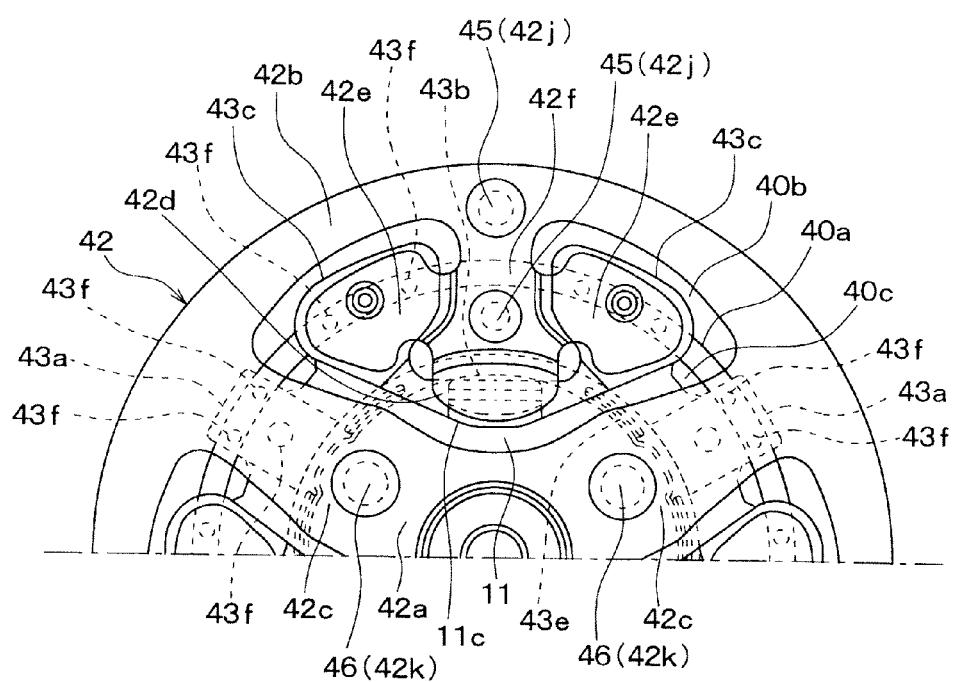
FIG. 14 is a front view illustrating a clutch mechanism in accordance with a seventh embodiment of the invention.

In the first embodiment, the outer annular disk part 40b and the inner annular disk part 40c of the armature 40 are connected by the bridging part 40d, and thereby integrally formed. In a seventh embodiment of the invention, as illustrated in FIG. 14, an outer annular disk part 40b and an inner annular disk part 40c of an armature 40 are separately formed.

More specifically, in the present embodiment, the bridging part 40d is omitted, and a slit hole 40a serves as an annular space separating the outer annular disk part 40b and the inner annular disk part 40c.

Accordingly, the magnetic flux generated by the electromagnet 51 passes through between the outer annular disk part 40b and the inner annular disk parts 40c, and the generation of magnetoresistance of the magnetic circuit is limited. As a result, the magnetoresistance of the magnetic circuit is decreased, and eventually, magnetic force generated by the magnetic circuit is increased.

In the above first embodiment, as a result of the magnetic flux passing through the bridging part 40d, the magnetoresistance of the magnetic circuit is generated. In the present embodiment, the bridging part 40d is no longer used. Accordingly, the magnetoresistance of the magnetic circuit is reduced, and eventually, the magnetic force generated by the magnetic circuit is further increased.

Modifications of the above embodiments will be described. In the above embodiments, the application of the clutch mechanism of the invention to the turning on and off of the power transmission from the engine 10 to the compressor 2 has been illustrated. However, the invention is not limited to this application. The invention is broadly applicable, for example, to the turning on and off of the power transmission between a drive source, such as an engine or an electric motor, and a generator which is activated by rotational driving force.

Additional advantages and modifications will readily occur to those skilled in the art. The invention in its broader terms is therefore not limited to the specific details, representative apparatus, and illustrative examples shown and described.

What is claimed is:
1. A clutch mechanism adapted for a drive source, the clutch mechanism comprising:
   a driving side rotating body that is rotated by rotational driving force from the drive source;
   a driven side rotating body that is joined to the driving side rotating body in a direction of a rotation axis of the driving side rotating body so that the rotational driving force is transmitted to the driven side rotating body, the driven side rotating body including a joining portion;
   an electromagnet that generates attracting magnetic force, which attracts the driven side rotating body in a joining direction in which the driven side rotating body is joined to the driving side rotating body;
   a damper that is made of a resilient member and includes an impact mitigation part and a contact portion, the impact mitigation part being configured to mitigate impact when the driven side rotating body collides with the driving side rotating body, and the contact portion being configured to reduce vibration of the driven side rotating body;
a plate spring that is configured to generate resilient force, which urges the driven side rotating body in an opposite direction from the joining direction, the plate spring including a pressing part that is configured to press the contact portion of the damper with a predetermined crushing allowance on the driven side rotating body both at a time when the electromagnet is energized and the driven side rotating body and the driving side rotating body are joined together and at a time when the electromagnet is deenergized and the driven side rotating body and the driving side rotating body are not joined together, and the joining portion of the driven side rotating body integrally joining the spring plate with the driven side rotating body;
a hub member that is joined to the driven side rotating body via the plate spring and a joining portion; and
the driving side rotating body, the driven side rotating body, the damper, and the plate spring being arranged in this order in the direction of the rotation axis; the contact portion of the damper being adjacent the joining portion of the driven side rotating body and contacting a part of the driven side rotating body in the direction of the rotation axis, and the impact mitigation part of the damper being arranged between the hub and the pressing part of the spring plate; and
the damper further including a flexure applying part that is placed between the plate spring and the driven side rotating body that provides an initial flexure to the plate spring, the flexure applying part being adjacent the joining portion joining the hub member and the driven side rotating body together, and the contact portion being closer than the flexure applying part to the joining portion joining the driven side rotating body and the plate spring together.

2. The clutch mechanism according to claim 1, wherein:
the driven side rotating body is formed in a shape of an annular disk;
the hub member is disposed radially inward of the driven side rotating body;
the plate spring further includes:
an inner circumferential portion that is fixed to the hub member;
an outer circumferential portion that is fixed to the driven side rotating body;
a plurality of arm portions, each of which connects the inner circumferential portion and the outer circumferential portion, the contact portion being disposed between adjacent two of the plurality of arm portions; and
a linguiform portion that extends in a tongue-shaped manner from a region of the outer circumferential portion between adjacent two of the plurality of arm portions toward the inner circumferential portion; and
the linguiform portion includes a compression part and the pressing part, the compression part which compresses the impact mitigation part of the damper.

3. The clutch mechanism according to claim 2, wherein the linguiform portion includes a stepped portion that is configured to position the pressing part further on an opposite side from the driven side rotating body than the outer circumferential portion.

4. The clutch mechanism according to claim 2, further comprising two of the joining portions integrally joining the spring plate with the driven side rotating body, the joining portions being provided respectively at regions of the linguiform portion on both sides of the pressing part in a circumferential direction of the driven side rotating body.

5. The clutch mechanism according to claim 2, wherein:
the driven side rotating body includes an outer annular disk part located outward in a radial direction of the driven side rotating body, and an inner annular disk part located inward in the radial direction of the driven side rotating body;
the outer annular disk part and the inner annular disk part are formed separately from each other;
the driven side rotating body further includes an annular space; and
the outer annular disk part and the inner annular disk part are arranged in the radial direction of the driven side rotating body with the annular space therebetween.

6. The clutch mechanism according to claim 1, wherein the damper is formed integrally with the plate spring.

7. The clutch mechanism according to claim 1, wherein the damper is formed integrally with the driven side rotating body.

8. The clutch mechanism according to claim 1, wherein:
the joining portion is a rivet.

9. The clutch mechanism according to claim 8, wherein the rivet is formed integrally with the driven side rotating body.

10. The clutch mechanism according to claim 8, wherein the rivet includes a head and a shaft, and the contact portion of the damper is arranged under the head and adjacent the shaft of the rivet.

11. The clutch mechanism according to claim 1, further comprising:
a plate member that receives the impact mitigation part, wherein the plate member is fixed to the hub member.

12. The clutch mechanism according to claim 1, wherein a receiving part, which receives the impact mitigation part, is formed integrally with the hub member.

13. A clutch mechanism adapted for a drive source, the clutch mechanism comprising:
a driving side rotating body that is rotated by a rotational driving force from the drive source;
a driven side rotating body that is joined to the driving side rotating body in a direction of a rotation axis of the driving side rotating body and that transmits the rotational driving force to the driven side rotating body, the driven side rotating body including a joining portion;
a damper including a resilient member having an impact mitigation part and a contact portion, the impact mitigation part being configured to mitigate impact when the driven side rotating body collides with the driving side rotating body, and the contact portion being configured to reduce vibration of the driven side rotating body;
an electromagnet generating a magnetic force and attracting the driven side rotating body in a joining direction and joining the driven side rotating body to the driving side rotating body;
a plate spring generating a resilient force and urging the driven side rotating body in an opposite direction from the joining direction, the plate spring including a pressing part, the pressing part together with the contact portion of the damper being configured to reduce vibration of the driven side rotating body and a chattering noise of the clutch mechanism by pressing the contact portion against the driven side rotating body both when the electromagnet is energized and when the electromagnet is deenergized and the driven side rotating body and the driving side rotating body are respectively joined and not joined together;

a hub member joining the driven side rotating body via the plate spring and a joining portion;

the driving side rotating body, the driven side rotating body, the damper and the plate spring being arranged in this order in the direction of the rotation axis; the contact portion of the damper being adjacent and on opposite sides of the joining portion of the driven side rotating body and contacting a part of the driven side rotating body in the direction of the rotation axis, and the impact mitigation part of the damper being arranged between the hub and the pressing part of the spring plate; and the damper further including a flexure applying part that is placed between the plate spring and the driven side rotating body that provides an initial flexure to the plate spring, the flexure applying part being adjacent the joining portion joining the hub member and the driven side rotating body together, and the contact portion being closer than the flexure applying part to the joining portion joining the driven side rotating body and the plate spring together.

14. The clutch mechanism according to claim 13, wherein the joining portion is a rivet having a head and a shaft, and the contact portion of the damper is arranged under the head and adjacent the shaft of the rivet.

* * * * *